Patented Oct. 15, 1940

2,217,693

UNITED STATES PATENT OFFICE 2,217,693

AZO COMPOUND AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application November 6, 1936, Serial No. 109,545

19 Claims. (Cl. 8—50)

This invention relates to aromatic azo compounds. More particularly it relates to nuclear non-sulfonated aromatic azo compounds suitable for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that a valuable series of aromatic azo compounds can be obtained by diazotizing an aromatic amine having the formula:

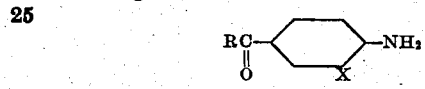

wherein R represents an alkyl or cycloalkyl group and X represents an alkyl group, an alkoxy group, a nitro group or a halogen atom, such as fluorine, chlorine, bromine, or iodine, and coupling with an aromatic or heterocyclic coupling component. The compounds obtained by the above described coupling reaction may be represented by the formula:

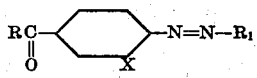

wherein X and R have the meaning above given and R₁ is an aromatic or heterocyclic coupling component. Advantageously, R₁ is an aryl nucleus of the benzene series.

Similarly, while our invention relates broadly to the azo compounds above described, it relates more particularly to such compounds wherein R represents an alkyl group, and especially to those compounds wherein R is a methyl group.

The nuclear non-sulfonated azo compounds of our invention constitute a valuable class of dyes suitable for the dyeing or coloration of material made of or containing organic derivatives of cellulose. The dyeings produced employing said non-sulfonated azo compounds are in general of good fastness to light and washing and range in shade from greenish yellow to purple. The nuclear sulfonated compounds of our invention possess little or no practical utility for the dyeing of organic derivatives of cellulose but may be employed for the dyeing of other materials such as cotton and wool, for example, being applied thereto by the customary methods of application.

Both water soluble and water insoluble compounds are included within the scope of our invention. Water soluble compounds can be prepared by introducing a water solubilizing group, such as a sulfonic acid group or a sulfato group into the coupling component. It will be understood that said water solubilizing group is in the form of a water soluble salt, for example, a salt of an alkali metal, such as sodium or potassium or ammonium. To illustrate, water soluble compounds suitable for the coloration of organic derivatives of cellulose can be prepared by diazotizing an aromatic amine having the formula:

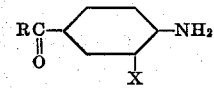

wherein R and X have the meaning previously given them, and coupling with a nuclear non-sulfonated aryl nucleus having an alkylene sulfonic acid group, other than methylene, attached through nitrogen to the aryl nucleus.

The preparation of water soluble aryl azo compounds, having an alkylene sulfonic acid group, other than methylene, attached through nitrogen to an aryl nucleus, suitable for the coloration of organic derivatives of cellulose is described and claimed in our copending application S. N. 78,170, filed May 6, 1936, now Patent No. 2,107,898. The general method of preparation described therein may be employed for example, in preparing water soluble compounds included within the scope of the present invention although any suitable method can be used.

The following examples illustrate the method of preparation of the azo compounds of our invention. Quantities are expressed in parts by weight.

*Example 1*

21.4 parts of 3-bromo-4-aminoacetophenone are dissolved in 150 parts of water containing 36 parts of 36% hydrochloric acid. The resulting solution is iced and diazotized by the addition of 6.9 parts of sodium nitrite dissolved in water.

10.8 parts of p-cresol are dissolved in 100 parts of water containing 10 parts of sodium hydroxide. The resulting solution is iced, and the diazo solution prepared above is added with stirring. Upon completion of the coupling reaction, the mixture is made acid to litmus with acetic acid and the precipitated dye is filtered, washed with water and dried.

Example 2

17.5 parts of ethyl-β-hydroxyethylaniline are dissolved in 105 parts of glacial acetic acid and the diazo solution prepared exactly as described in Example 1 is added. The mixture is permitted to stand for fifteen minutes after which it is made neutral to Congo red paper by the addition of sodium acetate. Upon completion of the coupling reaction, the dye is precipitated by the addition of water, filtered, washed with water, and dried.

Example 3

26.1 parts of 3-iodo-4-aminoacetophenone are dissolved in 150 parts of water containing 36 parts of 36% hydrochloric acid and diazotized in the usual manner by the addition of 6.9 parts of sodium nitrite dissolved in water.

17.4 parts of 1-phenyl-3-methyl-5-pyrazolone are dissolved in 200 parts of water containing 31.8 parts of sodium carbonate and coupled, in accordance with the usual practice, with the diazo solution prepared above. Upon completion of the coupling reaction, the mixture is made slightly acid to litmus with acetic acid and the precipitated dye compound is filtered, washed with water, and dried.

Example 4

23.1 parts of di-β-hydroxyethyl-α-naphthylamine are dissolved in 158 parts of cold ethyl alcohol and the diazo solution, prepared as described in Example 3, is added with stirring. The mixture is allowed to stand for fifteen minutes after which sodium bicarbonate is added until it is neutral to Congo red paper. Upon completion of the coupling reaction, the dye is precipitated with water, filtered, washed with water, and dried.

Example 5

18 parts of 3-nitro-4-aminoacetophenone are added to 150 parts of water containing 36 parts of 36% hydrochloric acid and the mixture is diazotized by the addition of 6.9 parts of sodium nitrite dissolved in water.

10.8 parts of m-cresol are dissolved in 100 parts of water containing 10 parts of sodium hydroxide. The resulting solution is iced, and the diazo solution is added with stirring. Upon completion of the coupling reaction, the mixture is made slightly acid to litmus with acetic acid and the precipitated dye is filtered, washed, and dried.

Example 6

17.9 parts of propyl-β-hydroxyethylaniline are dissolved in 105 parts of glacial acetic acid and the diazo solution, prepared as described in Example 5 is added with stirring. After standing fifteen minutes, sodium acetate is added until the mixture is neutral to Congo red paper. The dye formed by the coupling reaction is precipitated by the addition of water, filtered, washed and dried.

Example 7

16.3 parts of diphenylamine are dissolved in 157 parts of glacial acetic acid and coupled in the usual manner with the diazo solution prepared as described in Example 5. Upon completion of the coupling reaction, the dye is precipitated with water, filtered, washed, and dried.

Example 8

24.6 parts of sodium 1-hydroxynaphthalene-5-sulfonic acid are dissolved in 100 parts of water containing 31.8 parts of sodium carbonate and coupled with the diazo solution, prepared as described in Example 5. Upon completion of the coupling reaction, the dye is precipitated by the addition of sodium chloride, filtered, washed and dried.

Example 9

13.7 parts of β-hydroxyethylaniline are dissolved in 105 parts of glacial acetic acid and the diazo solution prepared as described in Example 5 is added with stirring. After standing for one hour, the mixture is made neutral to Congo red paper by the addition of sodium acetate and when coupling is complete, the dye is precipitated with water, filtered, washed, and dried.

Example 10

35.4 parts of 3-bromo-4-aminolaurophenone are diazotized in the usual manner.

An equivalent amount of

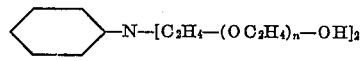

where $n$ is one or more, is dissolved in dilute hydrochloric acid and coupled with the diazotized 3-bromo-4-aminolaurophenone. The dye compound resulting is filtered, washed with water and dried.

Example 11

38.1 parts of 3-methoxy-4-aminopalmitophenone are diazotized in the usual manner.

An equivalent amount of

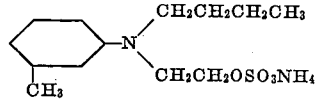

is dissolved in water and the diazotized 3-methoxy-4-aminopalmitophenone added with stirring. Concurrently with the addition of the diazo solution there is added a solution of sodium carbonate at such a rate that the mixture is slightly alkaline to Congo red paper. Upon completion of the coupling reaction the dye compound formed is salted out by the addition of sodium chloride, filtered, washed and dried.

In order that our invention may be fully understood the preparation of a number of intermediate substances employed in the manufacture of the compounds of the invention is disclosed hereinafter.

Preparation of methyl-3-chloro-4-aminophenyl ketone

This compound may be prepared as described in Journal of the Chemical Society, volume 85, pages 340–341 (1904).

Preparation of methyl-3-bromo-4-aminophenyl ketone

Methyl-3-bromo-4-acetylaminophenyl ketone may be prepared as described in The Journal of the American Chemical Society, volume 50, page 158 (1928). This compound may be converted to the hydrochloride of the desired compound upon heating with an aqueous hydrochloric acid solution.

Preparation of methyl-3-iodo-4-aminophenyl ketone

This compound may be obtained by preparing para iodo acetanilide as described in Journal of the Chemical Society, vol. 105, page 125 (1914) and converting it to the desired product by treatment with hot aqueous hydrochloric acid.

*Preparation of methyl-3-nitro-4-aminophenyl ketone*

This compound may be prepared as described in Journal of the Chemical Society, page 2403 for the year 1931.

*Preparation of 3-bromo-4-aminocyclohexylphenyl ketone*

30 grams of acetyl-p-aminocyclohexylphenyl ketone are dissolved in 400 cc. of acetic acid (glacial for example) and 300 cc. of water. A solution of 16 grams of bromine in 350 cc. of glacial acetic acid is added dropwise with stirring. After four hours the resulting mixture is poured with stirring into 4 liters of cold water containing 5 grams of sodium bisulfite. The product thus obtained is deacetylated by heating with hydrochloric acid to obtain the desired compound.

*Preparation of 3-nitro-4-aminocyclohexylphenyl ketone*

30 grams of acetyl-p-aminocyclohexylphenyl ketone are added with stirring over a period of about 30 minutes to 100 cc. of nitric acid (sp. gr. 1.5) at 0° C. After standing about 15 minutes the resulting mixture is poured on about 400 grams of ice. The 3-nitro-4-acetylaminocyclohexylphenyl ketone thus formed is recovered and deacetylated by heating with a mineral acid, such as hydrochloric acid, for example, to obtain the desired product.

The following tabulation further illustrates the compounds included within the scope of our invention together with the color they produce on cellulose acetate silk.

| Amine | Coupling component | Color on cellulose acetate silk |
|---|---|---|
| 3-chloro-4-aminoacetophenone | 1-phenyl-3-methyl-5-pyrazolone | Green yellow. |
| 3-bromo-4-aminoacetophenone | do | Do. |
| 3-iodo-4-aminoacetophenone | do | Do. |
| 3-nitro-4-aminoacetophenone | do | Do. |
| 3-chloro-4-aminoacetophenone | p-Cresol | Yellow. |
| 3-bromo-4-aminoacetophenone | do | Do. |
| 3-iodo-4-aminoacetophenone | do | Do. |
| 3-nitro-4-aminoacetophenone | do | Do. |
| 3-chloro-4-aminoacetophenone | Dimethylaniline | Orange red |
| 3-bromo-4-aminoacetophenone | do | Do. |
| 3-iodo-4-aminoacetophenone | do | Do. |
| 3-nitro-4-aminoacetophenone | do | Red. |
| 3-chloro-4-aminoacetophenone | Diphenylamine | Orange red. |
| 3-bromo-4-aminoacetophenone | do | Do. |
| 3-iodo-4-aminoacetophenone | do | Do. |
| 3-nitro-4-aminoacetophenone | do | Red. |
| 3-chloro-4-aminoacetophenone | Ethyl-β-hydroxyethylaniline | Do. |
| 3-bromo-4-aminoacetophenone | do | Do. |
| 3-iodo-4-aminoacetophenone | do | Do. |
| 3-nitro-4-aminoacetophenone | do | Do. |
| 3-bromo-4-aminopropiophenone | 1-phenyl-3-methyl-5-pyrazolone | Yellow. |
| 3-iodo-4-aminopropiophenone | do | Do. |
| 3-nitro-4-aminopropiophenone | do | Do. |
| 3-chloro-4-aminopropiophenone | do | Do. |
| 3-chloro-4-aminoacetophenone | Di-β-hydroxyethylaniline | Red. |
| 3-bromo-4-aminoacetophenone | do | Do. |
| 3-iodo-4-aminoacetophenone | do | Do. |
| 3-nitro-4-aminoacetophenone | do | Do. |
| 3-chloro-4-aminoacetophenone | m-Methyl-di-β-hydroxyethylaniline | Do. |
| 3-bromo-4-aminoacetophenone | do | Do. |
| 3-iodo-4-aminoacetophenone | do | Do. |
| 3-nitro-4-aminoacetophenone | do | Do. |
| 3-chloro-4-aminoacetophenone | | Do. |
| 3-bromo-4-aminoacetophenone | | |
| 3-iodo-4-aminoacetophenone | $\langle\ \rangle-N(CH_2-CH-CH_3)_2$ with $OH$ | Do. |
| 3-nitro-4-amonoacetophenone | | |
| 3-chloro-4-aminoacetophenone | | |
| 3-bromo-4-aminoacetophenone | $\langle\ \rangle-N(C_3H_7)(CH_2-CHOH-CH_3)$ | |
| 3-iodo-4-aminoacetophenone | | |
| 3-nitro-4-aminoacetophenone | | |
| 3-chloro-4-aminoacetophenone | m-Anisidine | Do. |
| 3-bromo-4-aminoacetophenone | do | Orange yellow. |
| 3-iodo-4-aminoacetophenone | do | Do. |
| 3-nitro-4-aminoacetophenone | do | Do. |
| 3-chloro-4-aminoacetophenone | Methyl-β-sulfoethylaniline sodium salt | Red. |
| 3-bromo-4-aminoacetophenone | do | Orange red. |
| 3-iodo-4-aminoacetophenone | do | Do. |
| 3-nitro-4-aminoacetophenone | do | Do. |
| 3-chloro-4-aminoacetophenone | β-hydroxyethylaniline | Red. |
| 3-bromo-4-aminoacetophenone | do | Orange yellow. |
| 3-iodo-4-aminoacetophenone | do | Do. |
| 3-nitro-4-aminoacetophenone | do | Do. |
| 3-fluoro-4-aminopropiophenone | Sodium sulfoethylbutyl aniline | Red |
| 3-fluor-4-aminocyclohexylphenone | do | Orange red. |
| 3-methoxy-4-aminopalmitophenone | do | Do. |
| 3-bromo-4-aminopropiophenone | Di-β-hydroxyethylaniline | Orange. |
| 3-nitro-4-aminopropiophenone | do | Orange red. |
| 3-methyl-4-aminopropiophenone | do | Red. |
| 3-methoxy-4-aminopropiophenone | do | Orange. |
| 3-methyl-4-aminoacetophenone | do | Do. |
| 3-methoxy-4-aminoacetophenone | do | Do. |
| 3-bromo-4-aminopropiophenone | m-Anisidine | Orange red. |
| 3-nitro-4-aminopropiophenone | do | Red. |
| 3-metyl-4-aminopropiophenone | do | Orange. |
| 3-methoxy-4-aminopropiophenone | do | Do. |
| 3-chloro-4-aminoacetophenone | Di-β-hydroxyethyl-α-naphthylamine | Red. |
| 3-bromo-4-aminoacetophenone | do | Do. |
| 3-iodo-4-aminoacetophenone | do | Do. |
| 3-nitro-4-aminoacetophenone | do | Do. |

In employing the water insoluble aromatic azo derivatives of our invention as dyes, they will ordinarily be applied to the material in the form of an aqueous suspension which can be prepared by grinding the dye to a paste in the presence of soap or other suitable dispersing agent and dispersing the resulting paste in water.

The water soluble azo compounds of our invention do not require a solubilizing treatment and may be added directly to the aqueous dyebath. These compounds may be applied, for example, from a neutral dyebath or by methods applicable to printing. Where they are applied from a neutral dyebath common salt may be added to promote exhaustion of the dyebath.

Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye bath will be raised to that selected for carrying out the dyeing operation. The temperature at which the dyeing is conducted will vary somewhat, depending, for example, on the particular material or materials undergoing coloration.

It will be understood that the azo compounds of our invention may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid, salts of sulphoricinoleic acid, and sulfonated oleic, stearic or palmitic acid, or salts thereof such, for instance, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber after which the dye is formed in situ by developing with a coupling component, such as disclosed herein. Conversely, the material undergoing dyeing may first be treated to absorb the coupling component and the dye subsequently formed in situ by coupling with an aryl diazonium salt.

The following examples describing the dyeing of cellulose acetate silk illustrate how dyeing may be carried out in accordance with the present invention. Quantities are expressed in parts by weight.

*Example 12*

2.5 parts of

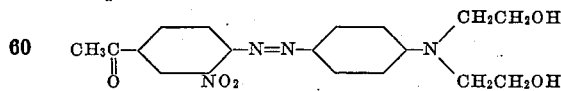

are finely ground with soap, sodium oleate, for example, and dispersed in 1000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Upon completion of the dyeing operation the cellulose acetate silk is removed, washed with soap, rinsed and dried. The cellulose acetate silk is dyed a deep red shade.

*Example 13*

2.5 parts of

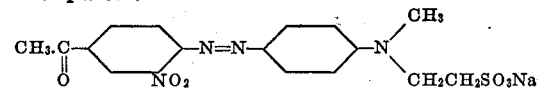

are dissolved in 230 parts of water and the mixture heated to about 80–85° C. and maintained at this temperature throughout the dyeing operation. 100 parts of cellulose acetate silk are added and allowed to remain in the dyebath, common salt being added as desired during the dyeing process to promote exhaustion of the dyebath, until dyeing is complete. The cellulose acetate silk is then removed, washed with soap, rinsed and dried. The cellulose acetate silk is dyed a red shade.

It will be understood that dyeing operations can be carried out in a manner similar to those described above by the substitution of another organic derivative of cellulose material for cellulose acetate silk or by employing a dye compound of the invention other than those employed in the examples, or by substitution of both the material being dyed and the dye compounds of the example.

We claim:

1. An azo compound having the general formula:

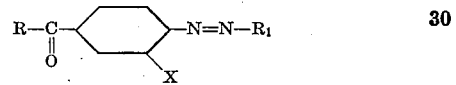

wherein R represents an alkyl group, X represents an alkyl group, an alkoxy group, a halogen atom or a nitro group and R₁ represents an aromatic or heterocyclic nucleus, said aromatic or heterocyclic nucleus being directly attached to the azo bond.

2. An azo compound having the general formula:

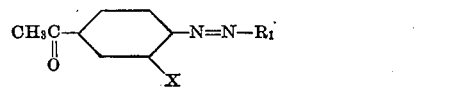

wherein X represents an alkyl group, an alkoxy group, a halogen atom or a nitro group and R₁ represents a nuclear non-sulfonated aromatic nucleus, said aromatic nucleus being directly attached to the azo bond.

3. An azo compound having the general formula:

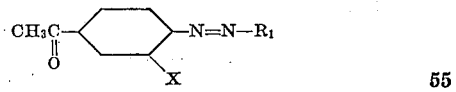

wherein X represents an alkyl group, an alkoxy group, a halogen atom or a nitro group and R₁ represents a nuclear non-sulfonated aryl nucleus of the benzene series, said benzene nucleus being directly attached to the azo bond.

4. An azo compound having the general formula:

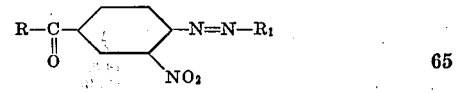

wherein R represents an alkyl group and R₁ represents a nuclear non-sulfonated aryl nucleus of the benzene series, said benzene nucleus being directly attached to the azo bond.

5. An azo compound having the general formula:

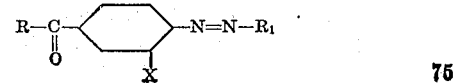

wherein R represents a member selected from the group consisting of an alkyl group and a cycloalkyl group, X represents a member selected from the group consisting of an alkyl group, an alkoxy group, a halogen atom and a nitro group and R₁ represents a member selected from the group consisting of an aromatic nucleus and a heterocyclic nucleus, said member being directly attached to the azo bond.

6. An azo compound having the formula:

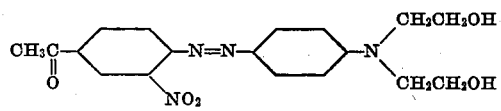

7. An azo compound having the formula:

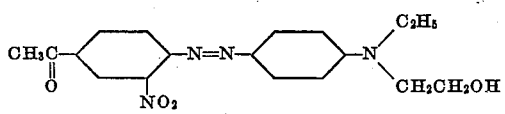

8. A process of coloring an organic derivative of cellulose which comprises applying thereto a dye selected from the class of azo compounds having the general formula:

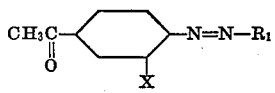

wherein X represents an alkyl group, an alkoxy group, a halogen atom or a nitro group and R₁ represents a nuclear non-sulfonated aryl nucleus of the benzene series, said benzene nucleus being directly attached to the azo bond.

9. A process of coloring a cellulose acetate which comprises applying directly thereto from an aqueous suspension a dye selected from the class of azo compounds having the general formula:

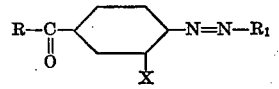

wherein R represents an alkyl group, X represents a member selected from the class consisting of an alkyl group, an alkoxy group, a halogen atom and a nitro group and R₁ represents a nuclear non-sulfonated aryl nucleus of the benzene series, said benzene nucleus being directly attached to the azo bond.

10. Process of dyeing cellulose acetate which comprises applying thereto a dye of the formula:

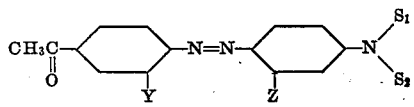

wherein Y is a substituent of the group consisting of halogen, nitro and methoxy, Z is a substituent of the group consisting of hydrogen or methyl, and S₁ and S₂ are substituents of the group consisting of ethyl and hydroxyethyl.

11. Process of dyeing cellulose acetate which comprises applying thereto a dye of the formula:

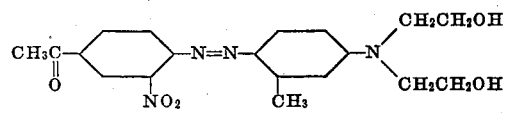

12. Process of dyeing cellulose acetate which comprises applying thereto a dye of the formula:

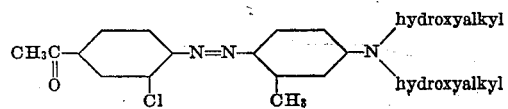

13. Process of dyeing cellulose acetate which comprises applying thereto a dye of the formula:

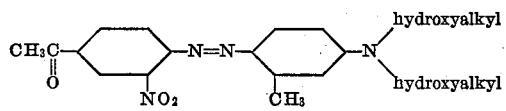

14. Material containing an organic derivative of cellulose colored with a dye selected from the class of azo compounds having the general formula:

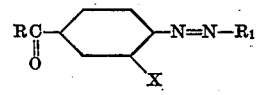

wherein R represents an alkyl or cycloalkyl group, X represents an alkyl group, an alkoxy group, a halogen atom or a nitro group and R₁ represents a nuclear non-sulfonated aromatic or heterocyclic nucleus, said aromatic or heterocyclic nucleus being directly attached to the azo bond.

15. Material containing an organic acid ester of cellulose colored with a dye selected from the class of azo compounds having the general formula:

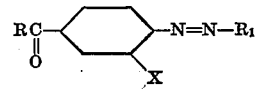

wherein R represents an alkyl or cycloalkyl group, X represents an alkyl group, an alkoxy group, a halogen atom or a nitro group and R₁ represents a nuclear non-sulfonated aromatic or heterocyclic nucleus, said aromatic or heterocyclic nucleus being directly attached to the azo bond.

16. Material containing an organic acid ester of cellulose colored with a dye selected from the class of azo compounds having the general formula:

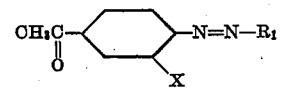

wherein X represents an alkyl group, an alkoxy group, a halogen atom or a nitro group and R₁ represents a nuclear non-sulfonated aryl nucleus of the benzene series, said benzene nucleus being directly attached to the azo bond.

17. A cellulose acetate colored with a dye selected from the class of azo compounds having the general formula:

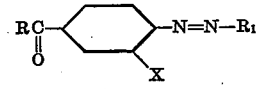

wherein R represents an alkyl or cycloalkyl group, X represents an alkyl group, an alkoxy group, a halogen atom or a nitro group and R₁ represents a nuclear non-sulfonated aromatic or heterocyclic nucleus, said aromatic or heterocyclic nucleus being directly attached to the azo bond.

18. A cellulose acetate colored with a dye selected from the class of azo compounds having the general formula:

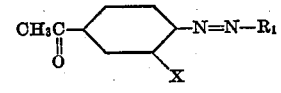

wherein X represents an alkyl group, an alkoxy group, a halogen atom or a nitro group and R₁ represents a nuclear non-sulfonated aryl nucleus of the benzene series, said benzene nucleus being directly attached to the azo bond.

19. A cellulose acetate colored with a dye selected from the class of azo compounds having the general formula:
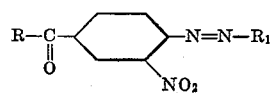
wherein R represents an alkyl group and $R_1$ represents a nuclear non-sulfonated aryl nucleus of the benzene series, said benzene nucleus being directly attached to the azo bond.
JAMES G. McNALLY.
JOSEPH B. DICKEY.